Sept. 23, 1941. A. C. LINDGREN ET AL 2,256,811
POWER DEPTH CONTROL
Filed Aug. 9, 1939 2 Sheets-Sheet 1
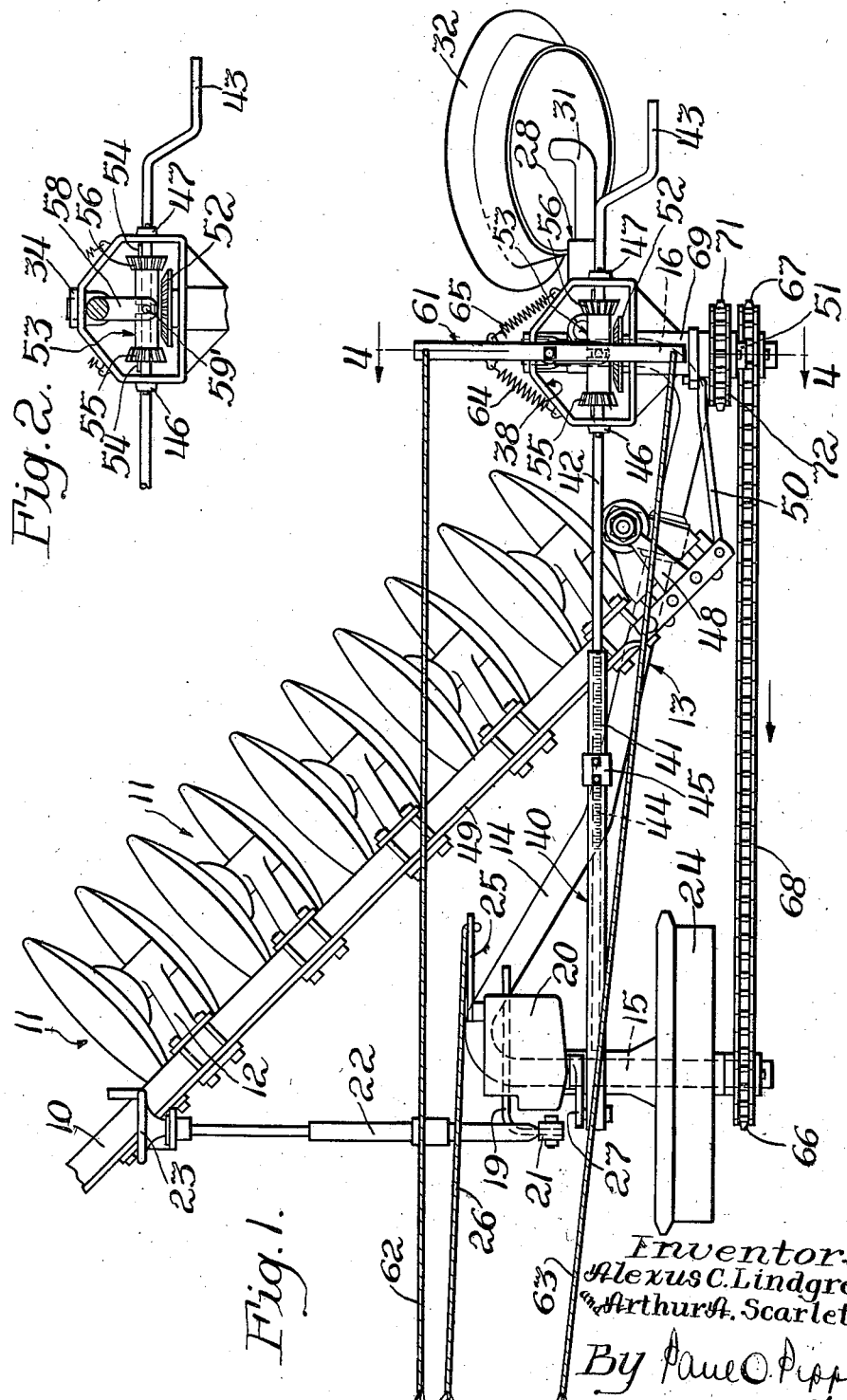
Inventors
Alexus C. Lindgren
Arthur A. Scarlett.
By Paul O. Pippel
Atty.

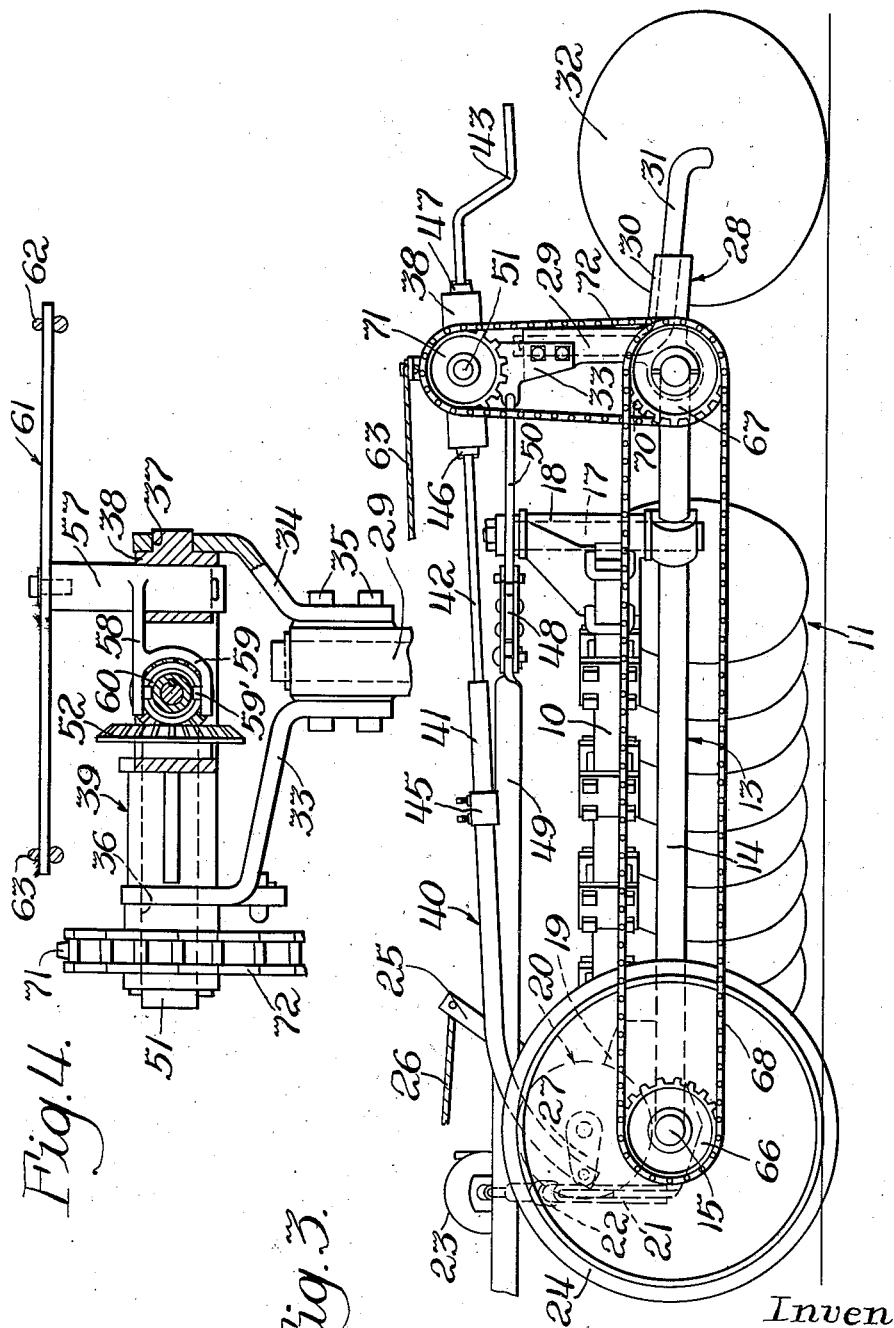

Patented Sept. 23, 1941

2,256,811

UNITED STATES PATENT OFFICE 2,256,811

POWER DEPTH CONTROL

Alexus C. Lindgren, Chicago, Ill., and Arthur A. Scarlett, Hamilton, Ontario, Canada, assignors to International Harvester Company, a corporation of New Jersey Application August 9, 1939, Serial No. 289,150

13 Claims. (Cl. 97—72)

This invention relates to ground-working implements, and more particularly to implements which are trailed from a tractor in which power for lifting the same to a transport position is derived from power mechanism forming a part of the implement.

More specifically, the invention has to do with a power depth control for a heavy tillage implement, such as a harrow plow, in which the rear end of its tool-carrying beam is supported on a truck structure, the forward wheel of which is adapted to run on the land and the rear wheel of which is adapted to run in the furrow, the adjustment of the plow to a transport position being accomplished by pivoting the bracket structure on which the rear furrow wheel is mounted, so that the beam and tools will be lifted about the land wheel as a pivot. Such an implement is described and claimed in the pending application of A. C. Lindgren et al., Serial No. 225,341, filed August 17, 1938, now Patent No. 2,184,428, granted December 26, 1939.

Thus, it is the object of this invention to provide an efficient depth control particularly adapted for this type of plow where the adjustment is about its land wheel.

According to this invention, there is provided an angularly adjustable bracket structure on the rear transversely extending axle portion of the truck member, which has vertically and rearwardly extending portions. A furrow wheel is mounted on the rearwardly extending portion of the bracket and, upon angular adjustment of the bracket to effect lifting, the same will tend to be brought forward under the pivot of the bracket structure, thereby effecting a raising movement to the rear end of the plow about the land wheel as a pivot. On the vertically extending portion of this bracket, there is provided a means adaptable to be engageable with the connection extending from a power lift mechanism associated with the land wheel and this connection being longitudinally adjustable. This engageable means is so arranged as to derive power from the land wheel through sprockets and chain drives and can be controlled by the operator on the tractor to effect engagement with the longitudinally adjustable connection, so that the same may be extended or shortened to effect regulating adjustment of the bracket structure about its point of pivot. The entire arrangement of the chain drive and its sprockets and the engageable means thereby provides means deriving power from the land wheel for effecting regulating adjustment of the tool-carrying beam and its working tools.

For a better understanding of the invention, reference may be had to the following detailed description taken in connection with the accompanying drawings, in which:

Figure 1 is a plan view of the rear end of a heavy tillage implement with its truck-supporting structure and the power control arrangement of the present invention;

Figure 2 is a fragmentary plan view of the engageable means;

Figure 3 is a view in elevation of the rear portion of a heavy tillage implement and showing particularly the drive connections of the engageable means with the land wheel; and, Figure 4 is an enlarged cross-sectional and fragmentary view of the engageable means taken along the lines 4—4 of Figure 1.

Referring now particularly to Figures 1 and 2, there is shown the rear portion of a heavy tillage implement, such as a harrow plow, comprising in general a forwardly and laterally extending tool beam 10, from which there are depended disk harrow units 11 by means of their depending brackets 12. The extreme rear end of the beam and tools is supported on a truck structure indicated generally at 13, the same having a pivotal connection with the rearwardmost end of the beam 10. The truck structure 13 includes a longitudinally extending member 14 having a transversely extending axle portion 15 at its forward end and a transversely extending axle portion 16 at its rear end. Between these axle portions 15 and 16, there is fixed to the longitudinally extending member 14 a vertically extending spindle 17 adapted to fit within a bracket 18 on the rearwardmost end of the beam 10 and forming the prime elements of the pivotal connection. Connected with the forward end of the longitudinally extending member 14 is a supporting bracket 19 for a power lift mechanism 20, on the forward end of which is a clevis 21 for connection with an adjusting link 22 of the telescoping type operable by means of a hand wheel 23 for pivoting the truck structure with respect to the beam to effect an adjustment of the width of cut taken by the harrow tools 11.

On the transversely extending axle portion 15 at the forward end of the truck member 14 there is journaled a land wheel 24 adapted to drive the power lift mechanism 20 through gears in a manner well known. As the land wheel proceeds along the ground, operation of the clutch mechanism may be effected by a control lever 25 connected by means of a rope 26 with a tractor and near to the operator's station thereon. Operation of the control lever 25 will cause power to be taken from the land wheel so as to rotate a crank 27 of the power lift mechanism through approximately 180 degrees.

On the transversely extending axle portion 16, at the rear portion of the truck member 14, there is mounted an angularly adjustable bracket structure indicated generally at 28. This bracket structure has a vertically extending portion 29 and a rearwardly extending portion 30. It may also contain a horizontally swingable or adjustable axle 31, on the rear end of which is journaled a rear furrow wheel 32.

The vertically extending portion 29 also includes two vertically extending projection members 33 and 34 connected thereto by bolts 35 and having alined openings 36 and 37 to receive pivotal portions of a supporting frame structure 38 of an engageable structure 39, thus being free to pivot about a horizontal axis and with respect to the upper end of the vertically extending portion 29 of the bracket structure 28.

To effect lifting of the tool beam and its tools to a transport position and about the land wheel as a pivot, there is connected to this frame structure a longitudinally adjustable connecting link means 40, which in turn is connected to the crank 27 of the power lift mechanism 20. This longitudinally adjustable link means 40 is preferably of the telescoping type consisting of a sleeve 41 and a rod 42 that extends through the frame structure 38 of the engageable means and terminates in a hand crank portion 43. The rod 42 has a threaded portion 44 particularly of a type adapted to run in an enlarged thread-engaging portion 45 of the sleeve 41, the object being generally to have an adjustable link connection of the telescoping type which is adjustable with a minimum of friction. The rod portion 42 of the adjustable link means is retained in the frame structure by means of collars 46 and 47 held fast in the usual manner by means of cotter pins.

It should now be seen that, by permitting pivotal movement of the frame structure on the upper end of the vertical portion 29 of the bracket structure as the power mechanism is operated to rotate the crank 27 through approximately 180 degrees, the link means 40 can serve to effect rearward movement of the vertical portion 29 of the bracket 28 to rotate the bracket 28 about the axle portion 16 of the truck frame member 14, which in turn will effect a lifting movement of the rear end of the truck member 14 and of the tool beam 10 with its tools 11 about the land wheel 24 as a pivot. The furrow wheel 32, connected to the rearwardly extending portion 30 of the bracket structure 28, will tend to move under the point of pivot of the bracket structure 28 with the transverse axle portion 16.

In order to effect a like movement of the front furrow wheel, not shown, there is provided a loose, horizontally pivotable member 48 to which is connected a rod 49 extending parallel with the tool beam to connect with the front furrow wheel structure in a manner such as shown in the above mentioned pending application, Serial No. 225,341. Connected at another point to the pivotable member 48 is a link 50, which is in turn connected to the projecting member 33 of the vertically extending portion 29 of the bracket structure to receive power lifting movement therefrom. Thus, when the rear furrow wheel is adjusted, a similar adjustment will be given to the front furrow wheel.

The engageable means 39 comprises, in addition to its frame 38, a transversely extending shaft 51 having a beveled gear 52 adapted for rotation within the frame structure 38. This gear 52 is within the proximity of the rod 42 extending through the frame structure on which there is a sleeve 53 slidable longitudinally on key means 54 along that portion of the rod 42 within the frame structure and having on each end thereof gears 55 and 56, either one of which can engage with the bevel gear 52, as desired by the operator and depending upon whether the adjustable link means 40 is to be shortened or lengthened. To operate this sleeve 53, there is provided a vertical pivotal shaft 57 having an arm 58, the outer end of which forms a yoke 59 in which there are detents 59' adapted to cooperate with a groove 60 in the sleeve 53. Fixed to the upper end of the vertical shaft 57 is a cross-bar 61, to the outer ends of which there may be connected ropes 62 and 63 adapted to extend forwardly to a point near to the operator's station on the tractor. When the operator on the tractor desires operation of the power depth control, he may pull the rope 62 or the rope 63, depending upon which gear 55 or 56 he desires to put into connection with the bevel gear 52. In order to bring the sleeve 53 into a neutral position after the adjustment has been made, there are provided two springs 64 and 65 on opposite sides, respectively, of the cross-bar 61 and connected, respectively, to the opposite sides of the frame structure 38 of the engageable means 39.

On the land wheel and operable to rotate therewith is a chain sprocket 66 adapted to be connected to a sprocket 67 by means of a chain drive 68 adapted to rotate on a transversely extending portion 69 of the bracket 28 and transversely alined with the pivot of the bracket structure 28 about the transverse axle portion 16. The sprocket 67 in turn will drive a sprocket 70 concentric with and drivingly connected to the same. Running from the sprocket 70 vertically and connected to a sprocket 71 for driving the shaft 51 and the bevel gear 52 is a vertically extending chain drive 72. The pivots of the frame structure 38 of the engageable means 39 are definitely alined with the pivots of the sprockets 67 and 70, which are in turn alined with the point of pivot of the bracket structure 28, so that movement of the bracket structure 28 about its pivot will not affect the chain drive mechanism 72. In other words, the chain drive mechanism 72 is free to pivot with the bracket structure 28.

In the operation, when it is desired to effect a decrease in the working depth of the working tools 11, the rope 62 is pulled against the action of the spring 65, thereby causing the arm 58 and sleeve to move rearwardly so as to place the gear 55 into engagement with the bevel gear 52 which is continually running in the same direction as the land wheel 24. The threaded connection between the rod 42 and the sleeve 41, being such as to lengthen the linkage means by an unscrewing of the rod, will thus cause the bracket structure 28 to rotate in a clockwise direction, as viewed in Figure 3, placing the furrow wheel nearer into vertical alinement with the point of pivot of the bracket 28 on the transverse axle portion 16. When it is desired to effect an increase, the rope 63 is pulled against the action of the spring 64, causing the arm 58 to place the gear 56 into engagement with the bevel gear 52. The direction of rotation then given to the rod 42 and the same having a right-hand thread will cause the linkage means 40 to be shortened and in that way give a counter-clockwise pivoting movement to the bracket structure 28, and allow the furrow wheel to fall back away from the pivot point of the bracket structure, thus lowering the truck member 14 and the beam 10 supported thereon. After the desired amount of regulating adjustment is given, the operator can release his hold on the rope and the springs 64 and 65 will tend to pull the gears 56 and 55, respectively, out of engagement, so that they assume a neutral position.

It should now be seen that an arrangement has been provided wherein a regulating adjustment may be given to a plow of the type in which adjustment is effected by pivotal movement about its land wheel. The driving sprockets and chain drives are so arranged as to provide power to the engaging means at all times and in effect this drive arrangement and the engaging means provide, broadly, means deriving power from the land wheel for effecting regulating adjustment of the tool beam and its tools about the land wheel. When it is desired to make a regulating adjustment by hand, it may be accomplished by rotating the crank handle 43.

While various changes may be made in the specific arrangement of parts, it shall be understood that such changes shall be within the spirit and scope of the invention as defined in the appended claims.

What is claimed is:

1. In a ground-working implement, a forwardly and laterally extending tool beam, working tools carried by the tool beam, a truck structure for supporting the rear end of the beam including a land wheel and an adjustable rear furrow wheel, and means operable by movement of the implement over the ground for effecting a depth regulating adjustment of the rear furrow wheel to regulate the working depth of the tools by adjustment of the beam and tools about the land wheel as a pivot.

2. In a ground-working implement, a forwardly and laterally extending tool beam, working tools carried by the tool beam, a truck structure for supporting the rear end of the beam including a land wheel and an adjustable rear furrow wheel, and means deriving power from the land wheel for effecting a depth regulating adjustment of the rear furrow wheel to regulate the working depth of the tools by adjustment of the beam and tools about the land wheel as a pivot.

3. In a disk plow construction, a forwardly and laterally extending tool beam, plow disks depending from the beam, a truck structure for supporting the rear end of the beam including a land wheel and a rear furrow wheel adjustable to effect adjustment of the beam and tools about the land wheel as a pivot, and means deriving power from the land wheel for effecting depth regulating adjustment of the rear furrow wheel to regulate the plowing depth.

4. In a disk plow construction, a forwardly and laterally extending tool beam, plow disks carried by the beam, a truck structure for supporting the rear end of the beam including a land wheel and a rear adjustable furrow wheel, a power lift mechanism adapted to be operated by the land wheel, means for connecting the power lift mechanism with the adjustable furrow wheel to effect lifting adjustment of the beam about the land wheel as a pivot, and means deriving power from the land wheel associated with the connecting means for effecting depth regulating adjustment of the rear furrow wheel to regulate the plowing depth.

5. In a ground-working implement, a forwardly and laterally extending tool beam, working tools carried by the beam, a truck structure for supporting the rear end of the beam including a substantially longitudinally extending wheel-carrying member having transversely extending axle portions one at the forward end and another at the rearward end thereof, a land wheel journaled on the forward axle portion of the member, a pivotable bracket structure angularly adjustable on the rear axle portions of the member including a rearwardly extending portion, a rear furrow wheel journaled on the rearwardly extending portion of the bracket structure, means for causing angular adjustment of the bracket structure whereby the beam and tools will be lifted to a transport position about the land wheel as a pivot, and means associated with the angularly adjusting means and operable by movement of the implement over the ground for effecting depth regulating adjustment of the rear furrow wheel.

6. In a ground-working implement, a forwardly and laterally extending tool beam, working tools carried by the beam, a truck structure for supporting the rear end of the beam including a substantially longitudinally extending wheel-carrying member having transversely extending axle portions one at the forward end and another at the rearward end thereof, a land wheel journaled on the forward portion of the member, a pivotable bracket structure angularly adjustable on the rear axle portions of the member including vertically and rearwardly extending portions, a rear furrow wheel journaled on the rearwardly extending portion of the bracket, means for causing angular adjustment of the bracket structure whereby the beams and tools will be lifted to a transport position about the land wheel as a pivot, a drive sprocket adapted to be driven by the land wheel, sprockets concentric with the pivot of the bracket structure and one of the same drivingly connected with said drive sprocket to be driven thereby, an engageable means optionally connectable with the angular adjusting means carried by the vertically extending portion of the bracket and adaptable to be adjustable with the bracket about its pivot, said engageable means having a driving sprocket with its center alined with one of the concentric sprockets and a sprocket chain connecting the two of said latter mentioned sprockets, whereby free operation of the chain regardless of the angularly adjusted position of the bracket is permitted.

7. In a ground-working implement, a forwardly and laterally extending tool beam, working tools carried by the beam, a truck structure for supporting the rear end of said beam including a longitudinally extending wheel-carrying member having transversely extending axle portions one at the forward end and another at the rearward end thereof, a land wheel on the forward transverse axle portion of the carrying member, a power lift mechanism associated with the land wheel to be operated thereby, a pivotable bracket structure angularly adjustable on the rearward axle portion of the carrying member and having vertical and rearwardly extending portions, a rear furrow wheel journaled on the rearwardly extending portion of the bracket structure, an optionally connectable engageable means including a frame transversely pivotable on the vertically extending portion of the bracket structure, a longitudinally adjustable link means connecting the power lift mechanism with the angularly adjustable bracket by means of the pivotable frame structure of the engageable means to angle the bracket structure to effect lifting of the beam and tools about the land wheel as a pivot to a transport position, and said engageable means adapted to be operated by power and optionally operatively engageable with the link means to effect depth regulating adjustment thereof whereby the working depth of the working tools will be regulated.

8. In a ground-working implement, a laterally extending tool beam, working tools on the beam, a truck structure for supporting one end of the tool beam including a fixed land wheel and a pivotally mounted rear furrow wheel, a power lift mechanism connected to said land wheel to be operated thereby and including a power output member, a longitudinally adjustable link connecting said output member with said pivotally mounted rear furrow wheel to pivot the same, to effect lifting movement of the beam and tools about the land wheel and power operated means associated with adjustable link to effect depth regulating adjustment of the same.

9. In a ground-working implement, a laterally extending tool beam, working tools on the beam, a truck structure for supporting one end of the tool beam including a fixed land wheel, an angularly adjustable bracket structure and rear wheel mounted on the adjustable bracket structure, a power lift mechanism connected to said land wheel to be operated thereby and including a power output member, an engageable means pivotally mounted on said bracket structure, a longitudinal adjustable link interconnecting the power output member and the engageable means to effect angular adjustment of the bracket structure upon operation of the power lift, and the connection of the link with the engageable means being such that elongation of the link may be effected by the engageable means to regulate the working depth of the beam and tools.

10. In a ground-working implement, a laterally extending tool beam, working tools on the beam, a truck structure for supporting the end of the beam mounted for lateral adjustment with respect to the beam and about a vertical pivot, a horizontally pivotable member adapted to be pivoted near the vertical pivot of the truck structure with the beam, a rear furrow wheel, an angularly adjustable bracket structure for mounting the rear furrow wheel, a link means connecting the horizontally pivotable member with the adjustable bracket structure to effect adjustment of the pivotable members therewith and means for angularly adjusting the bracket structure.

11. In a ground-working implement, a laterally extending beam, working tools on the beam, a truck structure for supporting the end of the beam including a rear furrow wheel and an angularly adjustable bracket structure for mounting the rear furrow wheel, an engageable means mounted on the adjustable bracket structure and adapted to be driven for effecting angular adjustment of the bracket, and means for driving said engageable means including parts on the bracket structure and angularly adjustable therewith and about a common center point of the bracket structure.

12. In a ground-working implement, a forwardly and laterally extending tool beam, working tools carried by the tool beam, a two-wheeled truck structure for supporting the rear end of the beam, means for adjusting one of the wheels, and means deriving power from one of the wheels for effecting depth-regulating adjustment of the beam and tools about one of the wheels as a pivot.

13. In a ground-working implement, a forwardly and laterally extending tool beam, working tools carried by the tool beam, a two-wheeled truck structure for supporting the rear end of the beam, one of the wheels being adjustable, and means for effecting adjustment of the adjustable wheel and deriving power from the other wheel to effect depth regulating adjustment of the beam and tools about the other wheel as a pivot.

ALEXUS C. LINDGREN.
ARTHUR A. SCARLETT.